US012705689B2

(12) United States Patent
Garud et al.

(10) Patent No.: US 12,705,689 B2
(45) Date of Patent: Aug. 11, 2026

(54) RGB-IR PIXEL PATTERN CONVERSION VIA ADAPTIVE FILTERING

(71) Applicant: TEXAS INSTRUMENTS INCORPORATED, Dallas, TX (US)

(72) Inventors: Hrushikesh Garud, Bangalore (IN); Mihir Mody, Bangalore (IN); Rajasekhar Allu, Plano, TX (US); Jing-Fei Ren, Plano, TX (US); Niraj Nandan, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 434 days.

(21) Appl. No.: 18/175,697

(22) Filed: Feb. 28, 2023

(65) Prior Publication Data

US 2024/0289920 A1 Aug. 29, 2024

(51) Int. Cl.

*G06T 3/4015* (2024.01)
*G06T 1/20* (2006.01)
*G06T 7/00* (2017.01)

(52) U.S. Cl.

CPC .............. *G06T 3/4015* (2013.01); *G06T 1/20* (2013.01); *G06T 7/0002* (2013.01); *G06T 2207/10024* (2013.01); *G06T 2207/10048* (2013.01); *G06T 2207/20004* (2013.01); *G06T 2207/20084* (2013.01)

(58) Field of Classification Search

CPC ....... G06T 3/4015; G06T 1/20; G06T 7/0002; G06T 2207/10024; G06T 2207/10048; G06T 2207/20004; G06T 2207/20084; H04N 25/13; H04N 23/843; H04N 25/135

See application file for complete search history.

(56) References Cited

U.S. PATENT DOCUMENTS

| | | | | |
|---|---|---|---|---|
| 11,361,398 | B2 * | 6/2022 | Lee | G06F 18/23 |
| 11,574,484 | B1 * | 2/2023 | Linzer | G06T 7/521 |
| 2013/0301927 | A1 * | 11/2013 | Clifton | G06T 7/001 382/195 |
| 2021/0350163 | A1 * | 11/2021 | Ojard | G06V 10/762 |
| 2022/0094847 | A1 * | 3/2022 | Yang | G06F 16/71 |

* cited by examiner

*Primary Examiner* — Oneal R Mistry
*Assistant Examiner* — Rachel L Roberts
(74) *Attorney, Agent, or Firm* — Michelle F. Murray; Frank D. Cimino

(57) ABSTRACT

Various embodiments disclosed herein relate to pixel pattern conversion, and more specifically to using an adaptive filter to convert complex pixel data to non-complex pixel formats. An image processing pipeline is provided herein that comprises an upstream component, a pattern conversion component downstream with respect to the upstream component in the image processing pipeline, and a downstream component relative to the pattern conversion component. The pattern conversion component is configured to obtain RGB-IR pixel data produced by the upstream component of the image processing pipeline, convert the RGB-IR pixel data into RGB pixel data and IR pixel data using an adaptive filter, and supply the RGB pixel data and the IR pixel data to the downstream component of the image processing pipeline.

20 Claims, 6 Drawing Sheets

RGB-IR PIXEL PATTERN CONVERSION VIA ADAPTIVE FILTERING

TECHNICAL FIELD

This relates generally to converting pixel arrays from one format to another format for use in image signal processing components.

BACKGROUND

Image sensors and imaging systems, such as camera-based systems, can produce images with red, green, and blue (RGB), and infrared (IR) pixels for visualization and processing. Image processing techniques can be employed on such images to produce high-quality digital images. In one example of such a technique, color filter array (CFA) patterns can be used to capture color information by placing color filters over pixel sensors of an image sensor. Generally, 2×2 patterns (i.e., 4 pixels in a repeating 2 pixel by 2 pixel grid) of RGB filters are most commonly supported by image signal processors (ISPs) or ISP algorithms. Consequently, existing systems do not commonly support 4×4 RGB-IR CFA processing (i.e., 16 pixels in a 4 pixel by 4 pixel grid). Processing of both RGB and IR pixels is important in a variety of uses, including safety features of electronic devices (e.g., Driver Monitoring Systems and Occupant Monitoring Systems), and other non-safety related features of devices, cameras, smart phones, and the like.

Traditional approaches can use programmable processing units and/or imaging pipelines capable of processing 2×2 color filter array (CFA) patterns, but such approaches also fail to process 4×4 RGB-IR CFAs. For example, some imaging pipelines can produce monochrome or multi-color digital images, but such designs assume that a color filter has a fixed density in the CFA pattern with a specific number of neighboring pixels of the same color as a pixel at a location. Further, such approaches also fail to perform such analysis and pre-processing on raw domain RGBIR images.

In other example software-hardware designs, some imaging pipelines can only process 4×4 RGB-IR CFAs using highly inefficient multiple-pass processing techniques. Such designs require multiple transfers of the CFA data between an imaging pipeline and external memory causing high latency and reduced processing capabilities. Additionally, such designs fail to eliminate IR contamination from RGB pixels to reproduce faithful color in output images.

SUMMARY

Disclosed herein are improvements to pixel pattern conversion processes and techniques. An example embodiment includes a system, such as an image processing pipeline configured to perform pixel pattern conversion, among other functions. The image processing pipeline comprises an upstream component, a pattern conversion component downstream with respect to the upstream component in the image processing pipeline, and a downstream component relative to the pattern conversion component. The pattern conversion component is configured to obtain RGB-IR pixel data produced by the upstream component of the image processing pipeline, convert the RGB-IR pixel data into RGB pixel data and IR pixel data using an adaptive filter, and supply the RGB pixel data and the IR pixel data to the downstream component of the image processing pipeline.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The drawings are not necessarily drawn to scale. In the drawings, like reference numerals designate corresponding parts throughout the several views. In some embodiments, components or operations may be separated into different blocks or may be combined into a single block.

DETAILED DESCRIPTION

Figure 1:
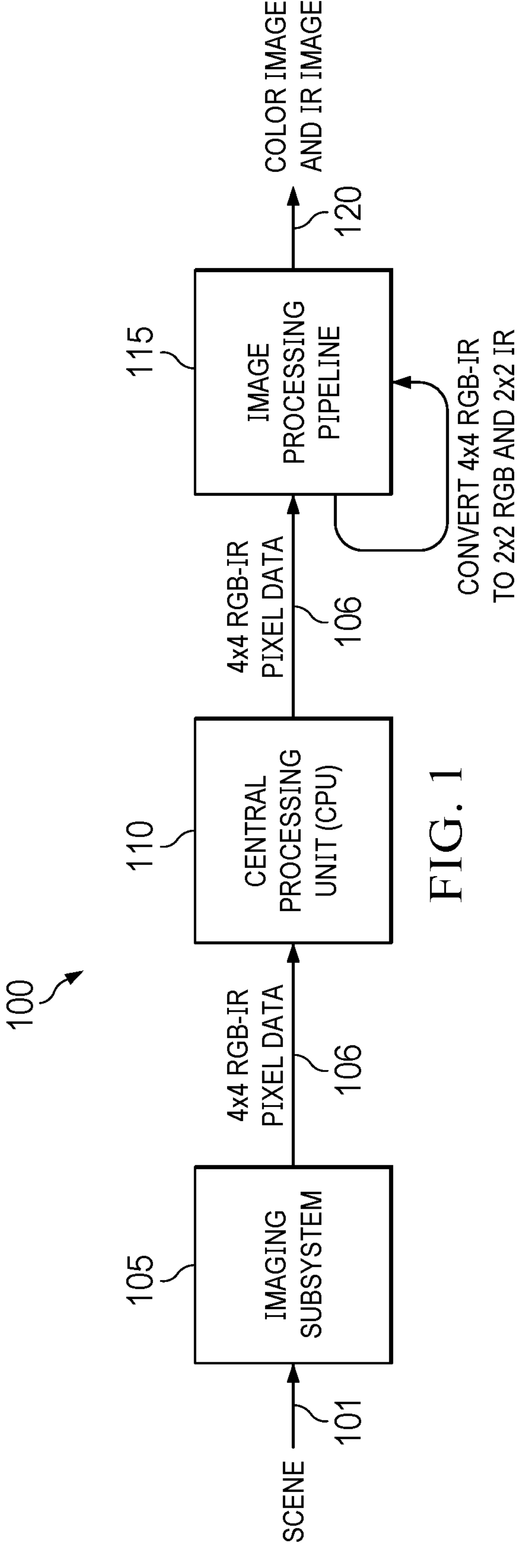
FIG. 1 illustrates an example system configurable to perform pixel pattern conversion.

Discussed herein are enhanced components, techniques, and systems related to color filter array (CFA) pattern conversion, and more specifically, to converting 4×4 red, green, blue, and infrared (RGB-IR) CFA patterns to other formats via adaptive filtering. The term pixel is often used to refer to an image sensor pixel, the smallest identifiable portion of an image sensor that provides a discrete value based on received light, and to refer to an image pixel, the smallest identifiable portion of an image having a single value, which is often produced by a corresponding image sensor pixel. A variety of imaging systems produce 4×4 RGB-IR CFA patterns. That is, the imaging systems employ filters over the image sensor pixels of the image sensors to capture information in a 4×4 RGB-IR format. However, as mentioned, ISPs, and components thereof, cannot use complex CFA patterns, such as 4×4 RGB-IR CFA patterns, as inputs for various image signal processing techniques. Not only must 4×4 RGB-IR CFA patterns often be separated into 2×2 RGB CFA patterns (e.g., a Bayer pattern) and 2×2 IR CFA patterns, but also the pixels in the 4×4 RGB-IR CFA patterns often require upsampling and decontamination to produce full-resolution, high quality color and IR images. Advantageously, apparatuses, devices, and systems described herein can support processing of 4×4 RGB-IR CFA pattern images, as well as any 2×2 CFA pattern, for conversion to other 2×2 CFA patterns. Accordingly, the improvements and methods described herein provide reliable and efficient ways to analyze pixels on-the-fly, such as via adaptive filtering using a convolution neural network, to perform upsampling, IR subtraction, or IR decontamination, and remosaicing of CFA patterns from one format to another format.

One example embodiment includes an image processing pipeline. The image processing pipeline comprises an upstream component, a pattern conversion component downstream with respect to the upstream component in the image processing pipeline, and a downstream component relative to the pattern conversion component. The pattern conversion component is configured to obtain RGB-IR pixel data produced by the upstream component of the image processing pipeline, convert the RGB-IR pixel data into RGB pixel data and IR pixel data using an adaptive filter, and supply the RGB pixel data and the IR pixel data to the downstream component of the image processing pipeline.

In another example, a pattern conversion component of an image processing pipeline is provided. The pattern conversion component comprises an interface and circuitry coupled to the interface. The interface is configured to communicate with upstream components and downstream components of the image processing pipeline relative to the pattern conversion component. The circuitry is configured to obtain, via the interface, RGB-IR pixel data produced by an upstream component of the image processing pipeline, convert the RGB-IR pixel data into RGB pixel data and IR pixel data using an adaptive filter, and supply, via the interface, the RGB pixel data and the IR pixel data to a downstream component of the image processing pipeline.

In yet another embodiment, a method of operating a pattern conversion component of an image processing pipeline is provided. The method comprises obtaining RGB-IR pixel data produced by a component of the image processing pipeline upstream relative to the pattern conversion component; converting the RGB-IR pixel data into RGB pixel data and IR pixel data by identifying features of pixels of the RGB-IR pixel data, calculating weights for each of the pixels based on the features, and applying a weight to each of the pixels; and supplying the RGB pattern and IR pattern to a downstream component of the image processing pipeline relative to the pattern conversion component.

FIG. 1 illustrates an example system configurable to perform pixel pattern conversion. FIG. 1 shows system 100, which includes imaging subsystem 105, central processing unit (CPU) 110, and image processing pipeline 115. Imaging subsystem 105 captures 4×4 RGB-IR pixel data 106 from scene 101. 4×4 RGB-IR pixel data 106 is provided to CPU 110, and further supplied to image processing pipeline 115 for processing and conversion to produce color and IR images 120 (referred to herein as images 120). In an example embodiment, such processes can be performed on 2×2 color filter array (CFA) inputs and/or 4×4 CFA inputs with red, green, blue, and infrared (RGB-IR) pixels.

In operation, imaging subsystem 105 is configured to capture data from scene 101. Imaging subsystem 105 may be a camera, one or more image sensors, a camera-based driver monitoring system (DMS), a camera-based occupant monitoring system (OMS), or the like, capable of producing images, videos, or frames from scene 101. Imaging subsystem 105 can produce an output made of a plurality of image pixels of various color channels in a pattern, such as 4×4 RGB-IR pixel data 106. In such an example, 4×4 RGB-IR pixel data 106 includes pixels arranged in a 4×4 pattern whereby each pixel is associated with one of a red, blue, green, or infrared (IR) color channel. Other pixel data of different color patterns or patterns can also be contemplated.

Imaging subsystem 105 provides 4×4 RGB-IR pixel data 106 to CPU 110. CPU 110 can store 4×4 RGB-IR pixel data 106 in memory, perform image signal processing techniques on the data, and/or provide the data to one or more subsystems or peripherals in communication with CPU 110. In one example, CPU 110 is included as part of a system-on-chip (SoC) configured to perform pixel pattern conversion processes described herein, among other functions. In this example, CPU 110 provides 4×4 RGB-IR pixel data 106 to image processing pipeline 115, which may also be a part of the SoC, to perform the pixel pattern conversion processes.

Image processing pipeline 115 includes components configured to perform pre-processing activities, pattern conversion, statistics generation, noise filtering, and/or other image processing activities on 4×4 RGB-IR pixel data 106. More specifically, image processing pipeline 115 can include a pattern conversion component configured to convert the 4×4 RGB-IR pattern of 4×4 RGB-IR pixel data 106 into pixel data having multiple, different patterns, such as a 2×2 RGB (red, green, and blue) pattern and a 2×2 IR pattern. Such converted pixel data may be used by other components of image processing pipeline 115 to produce images 120 (e.g., a color image and an IR image). Additional example details of image signal processors (ISPs), and components thereof, capable of processing 4×4 RGB-IR pixel data can be found in commonly assigned U.S. patent application Ser. No. 17/129,818, entitled "Method and Apparatus for Processing RGB-Infrared (RGB-IR) Sensor Data," filed on Dec. 21, 2020, and U.S. Patent Application No. 63/393,310, entitled "DEFECTIVE PIXEL CORRECTION," filed on Nov. 9, 2022, which are incorporated by reference in their entirety.

In various examples, the pattern conversion component of image processing pipeline 115 uses an adaptive filter to convert the 4×4 RGB-IR pattern of 4×4 RGB-IR pixel data 106 to two 2×2 CFA patterns. The adaptive filter may be configured to identify features of the pixels of 4×4 RGB-IR pixel data 106, calculate weights for the pixels of 4×4 RGB-IR pixel data 106 based on the features, and apply the weights to each of the pixels to produce the 2×2 RGB pattern and the 2×2 IR pattern. In some cases, the adaptive filter includes one or more convolution neural networks and/or convolutional layers. For example, the adaptive filter can use two convolutional layers, one dilated layer and one non-dilated layer, to identify the features of the pixels in 4×4 RGB-IR pixel data 106.

Still referring to FIG. 1, image processing pipeline 115 and components thereof are representative of hardware components capable of implementing the pattern conversion processes described herein. Examples of image processing pipeline 115 include integrated circuits (ICs), application specific integrated circuits (ASICs), logic devices, and other such circuitry, as well as any combination or variation thereof. Alternatively, image processing pipeline 115 may be implemented as general purpose hardware, such as a microprocessor, capable of executing software and/or firmware that embodies the logic of the defective pixel detection processes disclosed herein. Image processing pipeline 115 may be implemented within a single processing device, but it may also be distributed across multiple processing devices or subsystems that cooperate in executing instructions.

Image processing pipeline 115, and components thereof, can also be configured to convert CFA patterns, other than 4×4 RGB-IR CFA patterns, to different CFA patterns. Examples of other CFA patterns include various Bayer patterns, RGBE, RYYB, CYYM, CYGM, RGBW, RCCC, and RCCB patterns, among other CFA patterns.

Figure 2:
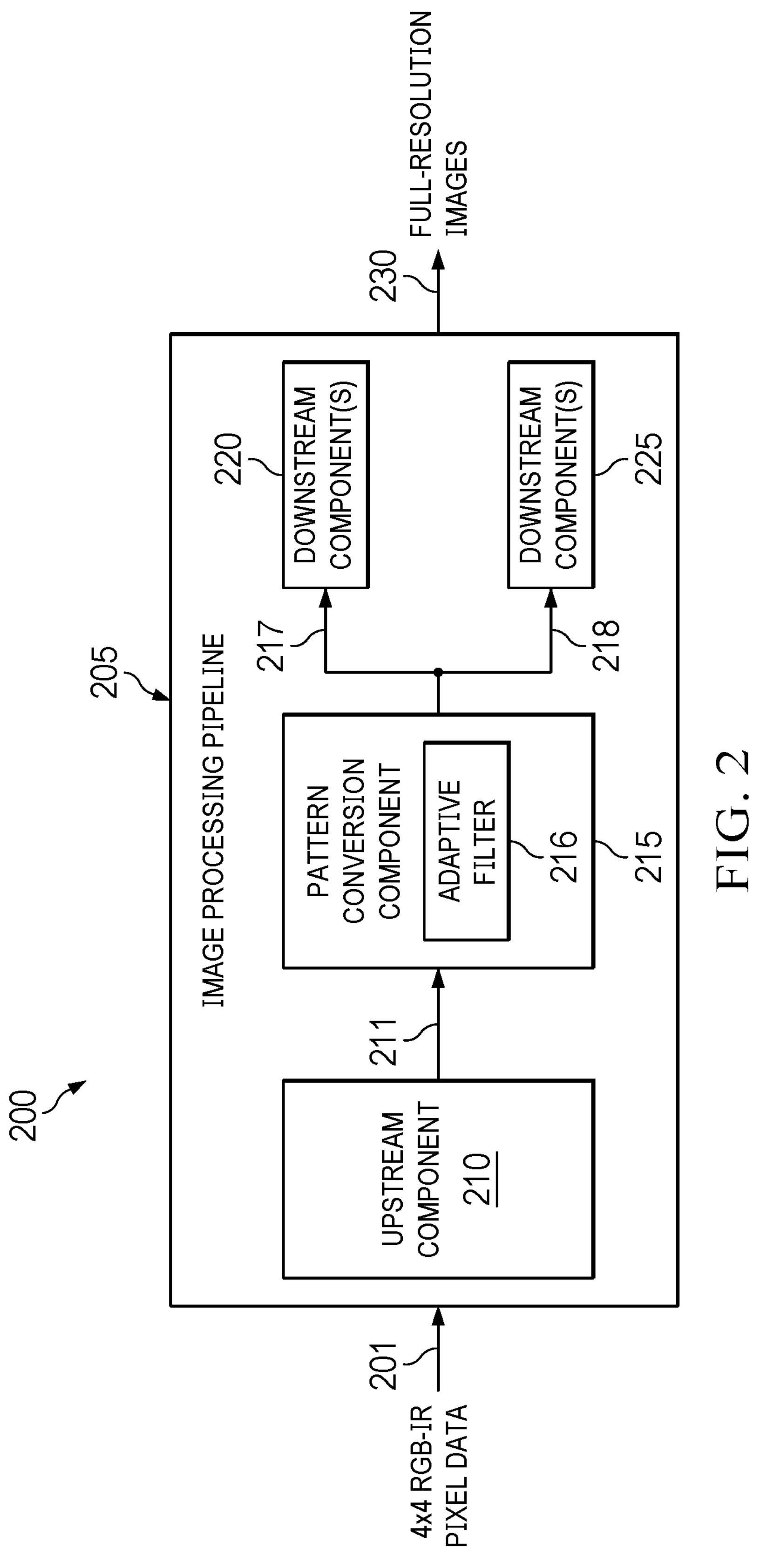
FIG. 2 illustrates an example operating environment configurable to perform pixel pattern conversion.

Moving to FIG. 2, FIG. 2 illustrates an example operating environment configurable to perform pixel pattern conversion. FIG. 2 shows operating environment 200, which includes image processing pipeline 205 and components thereof. Image processing pipeline 205 includes upstream component 210, pattern conversion 215, and downstream components 220 and 225. Image processing pipeline 205 is representative of an image processing pipeline (e.g., image processing pipeline 115 of FIG. 1), or vision imaging subsystem (VISS), configurable to obtain 4×4 RGB-IR pixel data 201 (e.g., from CPU 110 of FIG. 1), process and convert the pixel data, and produce full-resolution images 230.

In operation, image processing pipeline 205 is configured to obtain 4×4 RGB-IR pixel data 201. 4×4 RGB-IR pixel data 201 is representative of pixel data in a 4×4 CFA pattern, such as in an RGB-IR pattern, captured by an imaging system (e.g., imaging system 105). Each pixel in 4×4 RGB-IR pixel data 201 may have a different value than other pixels in the 4×4 CFA pattern. Values of the pixels of the 4×4 RGB-IR pixel data 201 may be based on image features occurring at locations in the image data. For example, image features may cause some locations to appear brighter than others, darker than others, include edges or corners, or the like. Image features may refer to features present within the image data and/or features present in physical locations of an image.

Upstream component 210 of image processing pipeline 205 is configured to receive 4×4 RGB-IR pixel data 201. Upstream component 210 is representative of any component of image processing pipeline 205 upstream in image processing pipeline 205 relative to pattern conversion component 215 and downstream components 220 and 225. For example, upstream component 210 may be a defective pixel correction component or another image processing component configured to perform front-end processing on 4×4 RGB-IR pixel data 201 and produce 4×4 RGB-IR pixel data 211 to be used by pattern conversion component 215.

Pattern conversion component 215 is representative of a component of image processing pipeline 205 configurable to obtain 4×4 RGB-IR pixel data 211, convert 4×4 RGB-IR pixel data 211 from a 4×4 RGB-IR pixel pattern to both a 2×2 RGB pixel pattern (e.g., a Bayer pattern) and a 2×2 IR pixel pattern, and supply the converted pixel data (e.g., 2×2 RGB pixel data 217 and 2×2 IR pixel data 218) to downstream components 220 and 225. To do so, pattern conversion component 215 includes adaptive filter 216. Adaptive filter 216 may include machine learning elements, such as a neural network with various layers (e.g., convolutional layers, fully-connected layers).

Adaptive filter 216 can identify features of the pixels of 4×4 RGB-IR pixel data 211 based on context of 4×4 RGB-IR pixel data 211. This identification entails identifying features for each pixel of 4×4 RGB-IR pixel data 211. In some cases, adaptive filter 216 can identify features based a location of a given pixel with respect to other pixels, characteristics of the pixel data at that location, and/or neighboring pixels with respect to the given pixel and other neighboring pixels (also referred to herein as context). Features may include information and characteristics about the pixels, such as a location of a given pixel within the array, brightness at the location of the given pixel, neighboring pixels with respect to the given pixel, and the like. Next, adaptive filter 216 can calculate weights for the pixels of 4×4 RGB-IR pixel data 211 based on the features. Adaptive filter 216 can determine multiple weights for each pixel. Alternatively, adaptive filter 216 may determine the weights on a per color channel basis. Adaptive filter 216 applies weights the pixels of a neighborhood to produce corresponding output pixel values of the 2×2 RGB pattern and the 2×2 IR pattern. In an example where adaptive filter 216 determines multiple weights per pixel of 4×4 RGB-IR pixel data 201, adaptive filter 216 can select one weight of the multiple weights for a given pixel and apply the selected weight to determine an interpolated value for either the 2×2 RGB pattern or the 2×2 IR pattern. Accordingly, adaptive filter 216 can use one weight to identify an interpolated pixel value to be used for the 2×2 RGB pattern and adaptive filter 216 can use a different weight to identify an interpolated pixel value to be used for the 2×2 IR pattern. Various combinations and variations of weights can be used to produce respective outputs via convolution methods.

Pattern conversion component 215 provides 2×2 RGB pixel data 217, or the 2×2 RGB pattern, to downstream components 220 and 2×2 IR pixel data 218, or the 2×2 IR pattern, to downstream components 225. Downstream components 220 and 225 are representative of any components of image processing pipeline 205 downstream in image processing pipeline 205 relative to upstream component 210 and pattern conversion component 215. For example, one of downstream components 220 and 225 may be a noise filter or another image processing component configured to perform operations on either or both of 2×2 RGB pixel data 217 and 2×2 IR pixel data 218. Following operations by downstream components 220 and 225, image processing pipeline 205 can produce full-resolution images 230.

Figure 3:
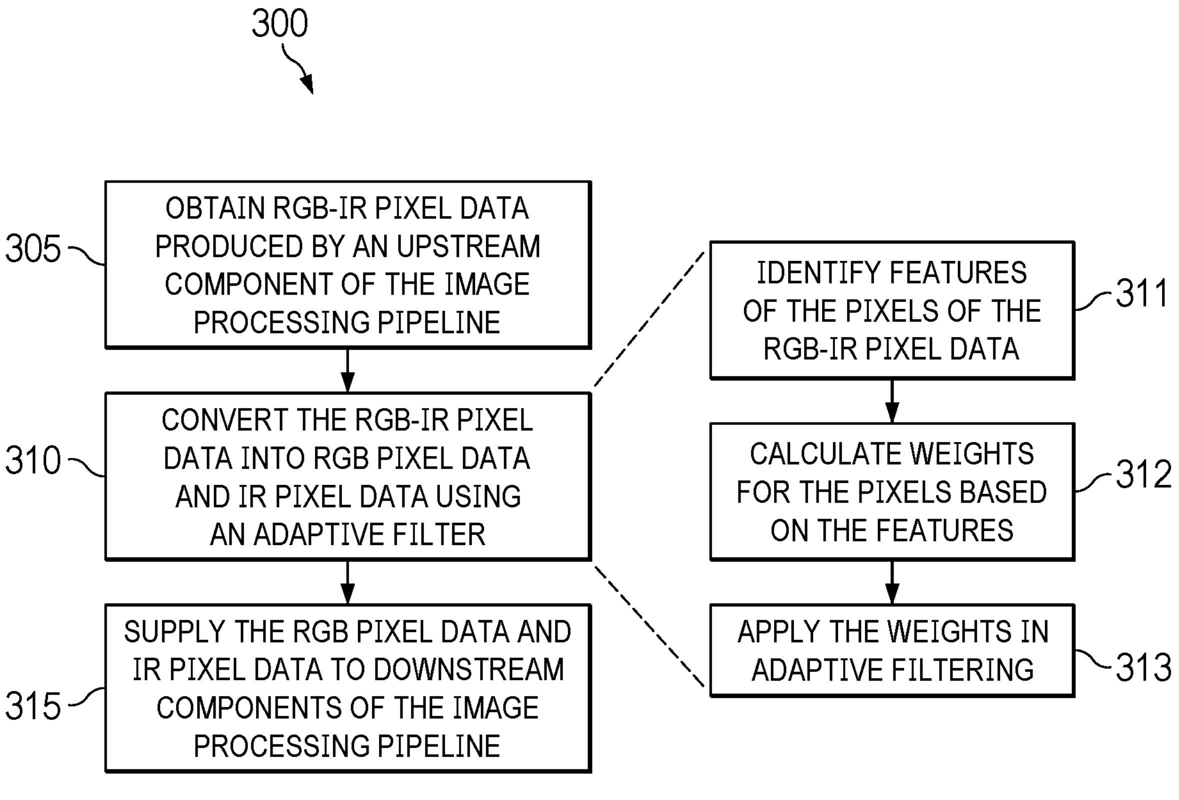
FIG. 3 illustrates a series of steps for converting pixel data from one format to other formats in an image processing pipeline.

FIG. 3 illustrates a series of steps for converting pixel data from one format to other formats in an image processing pipeline. FIG. 3 includes process 300 described parenthetically below, which references elements of FIG. 2. Process 300 can be implemented on fixed-purpose, dedicated hardware, programmable hardware, or a combination thereof. For example, process 300 can be performed by pattern conversion component 215, or an adaptive filter thereof, such as adaptive filter 216, or another apparatus or device.

In operation 305, pattern conversion component 215 obtains (305) 4×4 RGB-IR pixel data 211 produced by upstream component 210 of image processing pipeline 205. Upstream component 210 is representative of any component of image processing pipeline 205 upstream in image processing pipeline 205 relative to pattern conversion component 215 and downstream components 220 and 225. For example, upstream component 210 may be a defective pixel correction component or another image processing component configured to perform front-end processing on 4×4 RGB-IR pixel data 201 and produce 4×4 RGB-IR pixel data 211 to be used by pattern conversion component 215.

In operation 310, pattern conversion component 215 converts (310) the 4×4 RGB-IR pixel data 211 into 2×2 RGB pixel data 217 and 2×2 IR pixel data 218 using adaptive filter 216. Pattern conversion component 215 is representative of a component of image processing pipeline 205 configured to convert 4×4 RGB-IR pixel data 211 from a 4×4 RGB-IR pixel pattern to both a 2×2 RGB pixel pattern (e.g., a Bayer pattern) and a 2×2 IR pixel pattern. To do so, pattern conversion component 215 includes adaptive filter 216, which further includes machine learning elements, such as a neural network with various layers (e.g., convolutional layers, fully-connected layers).

Adaptive filter 216, in operation 311, identifies (311) features of the pixels of 4×4 RGB-IR pixel data 211. This identification entails identifying features for each pixel of 4×4 RGB-IR pixel data 211. In some cases, adaptive filter 216 can identify features based a location of a given pixel with respect to other pixels, characteristics of the pixel data at that location, and/or neighboring pixels with respect to the given pixel (also referred to herein as context). Features may include information about the pixels, such as a location of a given pixel within the array, brightness at the location (in the image data) of the given pixel, neighboring pixels with respect to the given pixel, and the like.

In operation 312, adaptive filter 216 calculates (312) weights for the pixels of 4×4 RGB-IR pixel data 211 based on the features. Adaptive filter 216 can determine multiple weights for each pixel. Alternatively, adaptive filter 216 may determine the weights on a per color channel basis. In some cases, adaptive filter 216 may determine the weights for a color channel based on which pixels neighbor a given pixel as well. In operation 313, adaptive filter 216 applies (313) the weights to produce the 2×2 RGB pattern and the 2×2 IR pattern. In an example where adaptive filter 216 determines multiple weights per pixel of 4×4 RGB-IR pixel data 201, adaptive filter 216 can select one weight of the multiple weights for a given pixel and apply the selected weight to determine an interpolated value for the given pixel to be used in either the 2×2 RGB pattern or the 2×2 IR pattern. Accordingly, adaptive filter 216 can use some weights to identify values for the 2×2 RGB pattern and different weights may be used to identify values for the 2×2 IR pattern. Various combinations and variations of weights can be used to produce respective outputs.

In operation 315, pattern conversion component 215 supplies (315) 2×2 RGB pixel data 217 and 2×2 IR pixel data 218 to downstream components (e.g., downstream components 220 and downstream components 225, respectively) of image processing pipeline 205. Downstream components 220 and 225 are representative of any components of image processing pipeline 205 downstream in image processing pipeline 205 relative to upstream component 210 and pattern conversion component 215. For example, one of downstream components 220 and 225 may be a noise filter or another image processing component configured to perform operations on either or both of 2×2 RGB pixel data 217 and 2×2 IR pixel data 218. Upon completion of process 300, pattern conversion component 215 can produce both color and IR images in full resolution.

Figure 4:
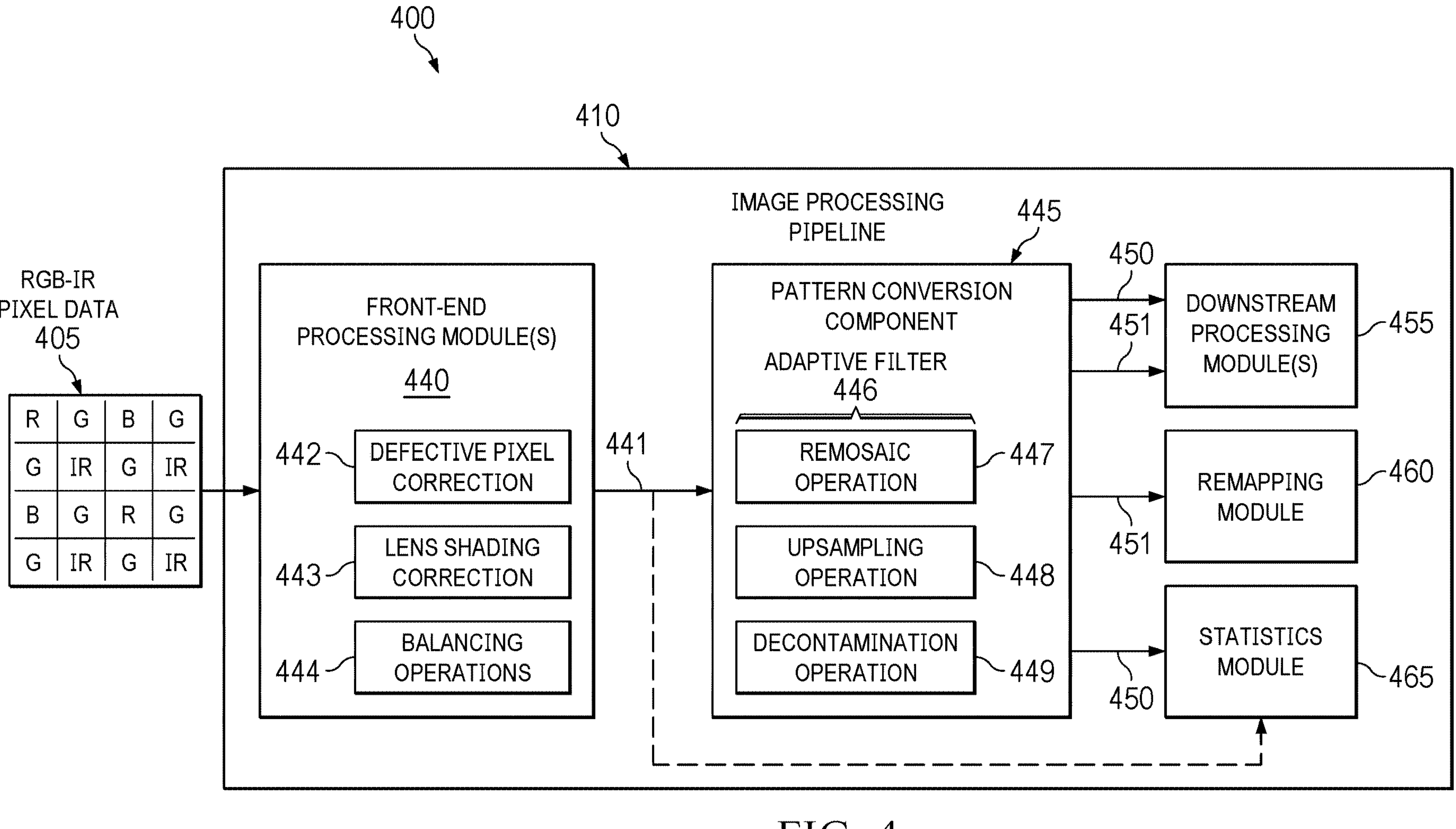
FIG. 4 illustrates an example operating environment for processing and converting pixel data in an embodiment.

FIG. 4 illustrates an example operating environment for processing and converting pixel data in an embodiment. FIG. 4 includes operating environment 400, which further includes image processing pipeline 410 and components thereof configured to perform operations on input pixel data, such as RGB-IR pixel data 405. Image processing pipeline 410 includes front-end processing modules 440, pattern conversion component 445, downstream processing module(s) 455, remapping module 460, and statistics module 465. For example, image processing pipeline 410 may represent image processing pipeline 115 of FIG. 1 or image processing pipeline 205 of FIG. 2. Accordingly, image processing pipeline 410, or adaptive filter 446 thereof, may implement process 300 of FIG. 3.

In operation, image processing pipeline 410 is configured to obtain RGB-IR pixel data 405. RGB-IR pixel data 405 includes a plurality of pixels arranged in a 4×4 CFA pattern, such as in an RGB-IR pattern, captured by an imaging system. In operating environment 400, RGB-IR pixel data 405 illustrates a 4×4 portion of the sensor pixel data to demonstrate an example RGB-IR pattern. In RGB-IR pixel data 405, each pixel may have different values (e.g., a red pixel may have a greater red value than another red pixel) than other pixels in RGB-IR pixel data 405. For example, some pixels may have a higher brightness value than other pixels, which may indicate an image feature represented in RGB-IR pixel data 405. By way of another example, some pixels may have values indicative of an image feature including a nearby edge, corner, or both.

Front-end processing module(s) 440 of image processing pipeline 410 is configured to receive RGB-IR pixel data 405. Front-end processing module(s) 440 is representative of one or more pre-processing components of image processing pipeline 410 upstream in image processing pipeline 410 relative to pattern conversion component 445 and other downstream components of image processing pipeline 410.

In operating environment 400, front-end processing module(s) 440 includes defective pixel correction 442, lens shading correction 443, and white balancing operations 444. Defective pixel correction 442 can be used to correct defective image pixels of RGB-IR pixel data 405. Additional example details of defective pixel correction can be found in commonly assigned U.S. Patent Application No. 63/393,310, entitled "DEFECTIVE PIXEL CORRECTION," filed on Nov. 9, 2022, which is incorporated by reference in its entirety. Lens shading correction 443 can be used to improve uniformity of brightness and color of the pixels of RGB-IR pixel data 405. White balancing operations 444 can be used to balance intensities of colors of the pixels of RGB-IR pixel data 405. Following operations by the components of front-end processing module(s) 440 of image processing pipeline 410, front-end processing module(s) 440 can provide RGB-IR pixel data 441 to pattern conversion component 445.

Pattern conversion component 445 is representative of a pattern converter configured to obtain RGB-IR pixel data 441, convert RGB-IR pixel data 441 from a 4×4 RGB-IR pixel pattern to both a 2×2 RGB pixel pattern (e.g., a Bayer pattern) and a 2×2 IR pixel pattern, and supply the converted pixel data (e.g., RGB pixel data 450 and IR pixel data 451) downstream in image processing pipeline 410.

Pattern conversion component 445 includes adaptive filter 446, which controls remosaic operation 447, upsampling operation 448, and decontamination operation 449. Remosaic operation 447 refers to a process of interpolating new pixel values from the pixels of RGB-IR pixel data 441 for creation of the 2×2 RGB pixel pattern and the 2×2 IR pixel pattern. Remosaic operation 447 may involve identifying a pixel value for each pixel in RGB-IR pixel data 441, identifying features of each of the pixels, and interpolating a new pixel value for each of the pixels based on the features. The new pixel values can replace the existing pixel values for each pixel in a respective location in the patterns to reconstruct, or remosaic, a different one of the pixel patterns.

Upsampling operation 448 refers to a process of increasing the resolution of RGB-IR pixel data 441. Similar to remosaic operation 447, upsampling operation 448 may entail identifying the pixel values of the pixels in RGB-IR pixel data 441, identifying the features of the pixels, and determining an upsampling value for each pixel of RGB-IR pixel data 441 based on the features. This operation may occur after remosaicing operation 447 such that the pixels in the 2×2 RGB pixel pattern and the 2×2 IR pixel pattern are upsampled after the pixels are remosaiced from the 4×4 RGB-IR pixel pattern. However, the operations may occur in any orders.

Decontamination operation 449 may refer to decontaminating red, green, and blue pixels of IR contamination. Decontamination operation 449 may entail identifying values of each of the pixels, including an amount of IR in each value, identifying the features of the pixels, and subtracting the IR amount from the pixel values of the pixels based on the features. In some cases, decontamination operation 449 is performed only on red, green, and blue pixels, and consequently, affects RGB pixel data 450 by removing IR values from the pixels in the RGB pixel pattern.

In various examples, adaptive filter 446 can perform each of remosaic operation 447, upsampling operation 448, and decontamination operation 449 in parallel via a convolution neural network (CNN), or other machine learning components. Adaptive filter 446 can configure the CNN to identify features of the pixels of RGB-IR pixel data 441. Features may include information about the pixels, such as a location of a given pixel within the array, brightness at the location of the given pixel, neighboring pixels with respect to the given pixel, and the like. The CNN can be configured to calculate weights for the pixels of RGB-IR pixel data 441 based on the features. The CNN can produce multiple weights for each pixel. Adaptive filter 446 applies a weight to each of the pixels to produce the 2×2 RGB pattern and the 2×2 IR pattern. In some cases, adaptive filter 446 selects the weight based on a given pixel and the operation (e.g., remosaic operation 447, upsampling operation 448, and decontamination operation 449) being performed on the given pixel. For example, adaptive filter 446 may select one weight to be applied to a red pixel during remosaic operation 447, and adaptive filter 446 may select a different weight to be applied to the same red pixel during upsampling operation 448 to generate different outputs. After applying one or more weights to each pixel in RGB-IR pixel data 441, adaptive filter 446 can produce pixel values for both the 2×2 RGB pixel pattern and the 2×2 IR pixel pattern.

Pattern conversion component 445 provides RGB pixel data 450 (e.g., the 2×2 RGB pixel pattern) and IR pixel data 451 (e.g., the 2×2 IR pixel pattern) to downstream processing module(s) 455. Downstream processing module(s) 455 represent any processing component(s) of image processing pipeline 410 downstream relative to front-end processing module(s) 440 and pattern conversion component 445. For example, downstream processing module(s) may include a noise filter, a tone mapper, a color processor, or any other image processing component. Downstream processing module(s) 455 can be configured to perform operations on either or both of RGB pixel data 450 and IR pixel data 451.

Pattern conversion component 445 also provides RGB pixel data 450 to statistics module 465 and IR pixel data 451 to remapping module 460. Remapping module 460 can use IR pixel data 451 to remap IR pixels as desired when producing a full-resolution IR image. Statistics module 465 can use RGB pixel data 450 and RGB-IR pixel data 441 to produce statistics and other information about the pixels. For example, statistics module 465 can provide information about defective pixels, pixels that were corrected, and characteristics of the pixels for auto-exposure, among other information. Following operations by downstream processing module(s) 455, remapping module 460, and statistics module 465, image processing pipeline 410 can produce full-resolution images.

Figure 5:
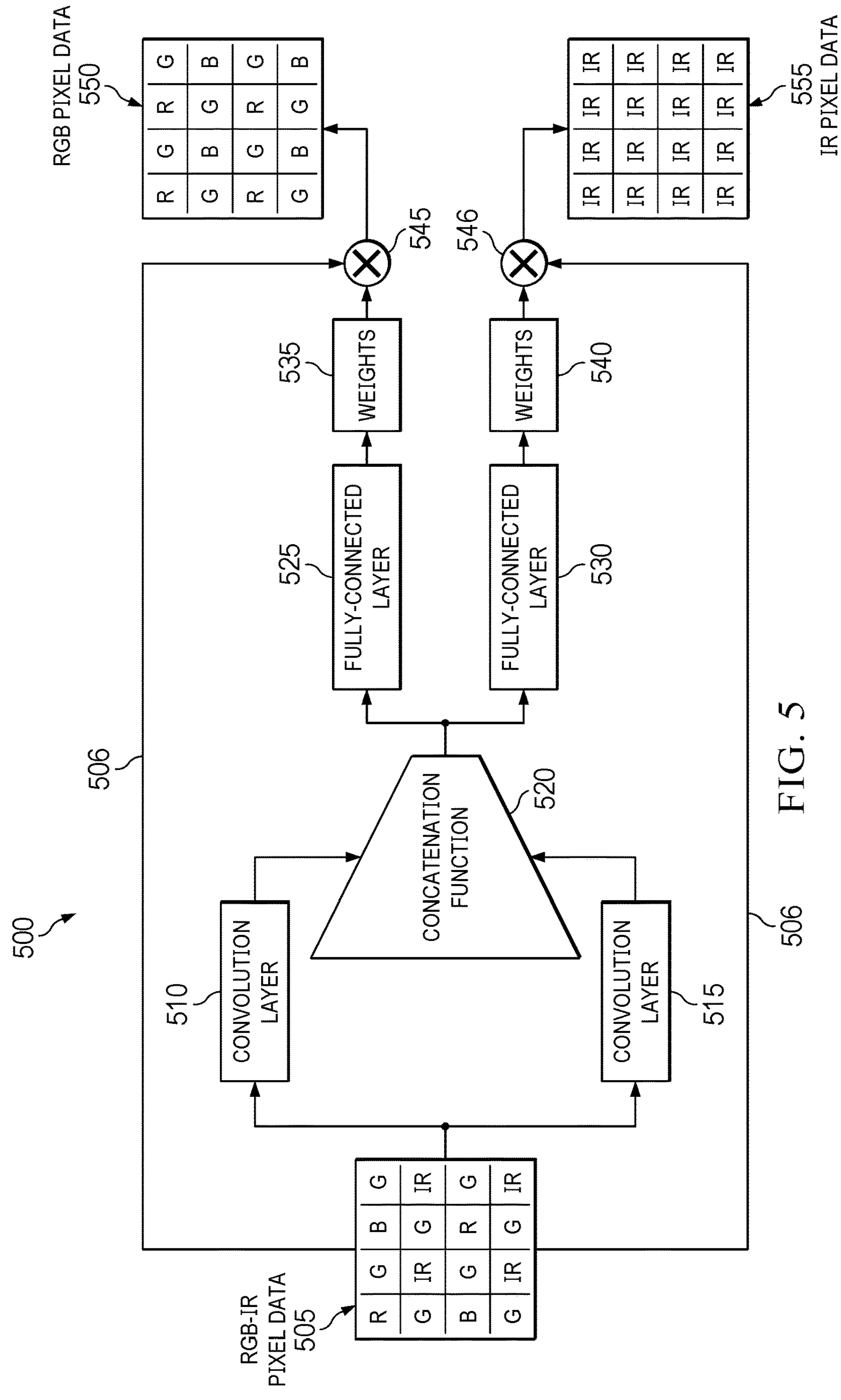
FIG. 5 illustrates an example adaptive filter configurable to perform pixel pattern conversion operations using convolutional layers and adaptive weights.

FIG. 5 illustrates an example adaptive filter configurable to perform pixel pattern conversion operations using convolutional layers and adaptive weights. FIG. 5 shows operating environment 500 including elements and components of an adaptive filter, such as adaptive filter 216 of FIG. 2 and/or adaptive filter 446 of FIG. 4. Operating environment 500 includes convolution layers 510 and 515, concatenation function 520, fully-connected layers 525 and 530, weights 535 and 540, and functions 545 and 546.

In operation, RGB-IR pixel data 505 is supplied as an input to convolution layers 510 and 515. RGB-IR pixel data 505 includes a plurality of pixels arranged in a 4×4 CFA pattern, such as in an RGB-IR pattern, captured by an imaging system. Each pixel in the data set may have different values (e.g., a red pixel may have a greater red value than another red pixel) than other pixels in RGB-IR pixel data 505. For example, some pixels may have higher brightness values than other pixels, which may indicate a bright spot in an image represented by RGB-IR pixel data 505. By way of another example, some pixels may have values indicative of a nearby edge, corner, or both of the image.

Convolution layers 510 and 515 are representative of layers in a convolution neural network (CNN). Convolution layer 510 may be configured to perform dilated convolution operations (e.g., a convolution operation that involves inserting gaps into the input data, or otherwise skipping pixels of the input data) on RGB-IR pixel data 505. Convolution layer 515 may be configured to perform non-dilated convolution operations on RGB-IR pixel data 505 (e.g., a convolution operation using the input without skipping elements). Both convolution layers 510 and 515 can produce feature vectors that differ from each other due to varying convolution techniques employed by each other and due to different sets of coefficients applied by each other. The sets of coefficients used by convolution layers 510 and 515 can include a plurality of coefficients stored in look-up tables (not illustrated) corresponding to values learned during training of the CNN when performing pattern conversion processes. In other words, some coefficients may correspond to a certain color channel of pixel and some coefficients may correspond to a specific pattern conversion operation (e.g., upsampling, IR decontamination).

In an example, convolution layer 510 can use a first set of coefficients and a neighborhood of pixels of RGB-IR pixel data 505 (e.g., a central pixel and a number of nearby pixels with respect to the central pixel) to calculate one set of feature vectors, while convolution layer 515 can use a second set of coefficients (different from the first set of coefficients) and a different neighborhood of pixels of RGB-IR pixel data 505 to calculate a different set of feature vectors. The different sets of feature vectors from convolution layers 510 and 515 can be fed into concatenation function 520.

Concatenation function 520 is configured to receive the feature vectors from convolution layers 510 and 515 and produce multi-scale features (i.e., features derived from using both dilated and non-dilated convolution techniques) associated with the pixels of RGB-IR pixel data 505. The multi-scale features can include information about the pixels of RGB-IR pixel data 505, including whether such locations are bright spots or dark spots, whether such locations are near corners and/or edges, and whether other image features are present. The features from the concatenation function 520 can be supplied as inputs to fully-connected layers 525 and 530.

Fully-connected layers 525 and 530 can be configured to generate weights for the pixels of RGB-IR pixel data 505 using the identified multi-scale features from the concatenation function 520 and different sets of coefficients (from the sets of coefficients fed to convolution layers 510 and 515). In the example illustrated in FIG. 5, fully-connected layer 525 determines weights 535 applicable to produce values for visible light pixels, or color pixels (e.g., red, green, and blue pixels), while fully-connected layer 530 determines weights 540 applicable to produce values for non-visible light pixels (e.g., IR pixels). To produce weights 535 and 540, fully-connected layers 525 and 530 can obtain coefficients from a look-up table (not illustrated) and apply the coefficients to the multi-scale features fed to fully-connected layers 525 and 530 by concatenation function 520. Fully-connected layers 525 and 530 can selectively apply one or more of the coefficients based on the color channel of a given pixel and/or the operation to be performed on the given pixel (e.g., remosaicing, upsampling, decontamination), for example.

For a given neighborhood 506 of RGB-IR pixel data 505, including a central pixel and various neighboring pixels with respect to the central pixel, the CNN calculates weights 535 and 540 based on the central pixel of neighborhood 506.

Then, the CNN feeds weights 535 and 540 to functions 545 and 546, respectively, along with the pixel data of neighborhood 506. Functions 545 and 546 represent pattern conversion operations, such as upsampling, interpolation, and IR decontamination, for example.

In operation, the CNN can determine to which color channel the central pixel of neighborhood 506 belongs. The CNN can also determine which function to apply to the central pixel of neighborhood 506. In some cases, the CNN may first apply functions 545 to the pixels of RGB-IR pixel data 505 to produce RGB pixel data 550, then the CNN may apply functions 546 to the pixels of RGB-IR pixel data 505 to produce IR pixel data 555. In other cases, however, the CNN may apply functions 545 to a given central pixel, then apply functions 546 to the given central pixel before ingesting a different central pixel. Various combinations and variations of processing can be contemplated.

By way of example, neighborhood 506 may include the first red pixel located in the top left corner of the pixel array of RGB-IR pixel data 505 and several corresponding neighboring pixels of the first red pixel. For this red pixel, multi-scale features can be identified and used to produce multiple different weights (e.g., weights 535). In this example, the adaptive filter may upsample the pixel value for this red pixel (i.e., apply an upsampling function of functions 545). A coefficient can be selected based on the red color channel and/or the upsampling function. Weights 535 can be calculated for the red pixel. Weights 535, the red pixel, and corresponding neighboring pixels (or collectively, neighborhood 506) are passed to functions 545 to apply the upsampling function and produce an upsampled red pixel value for the top left corner of the pixel array of RGB pixel data 550. The same process can occur for all pixels of RGB-IR pixel data 505 to achieve upsampled pixels of RGB pixel data 550.

By way of another example, neighborhood 506 may include the first blue pixel located in the first row and third column of RGB-IR pixel data 505 as the central pixel and several corresponding neighboring pixels with respect to the first blue pixel. During a pattern conversion process, an adaptive filter may be configured to output a red pixel in place of this blue pixel in RGB pixel data 550, as illustrated in FIG. 5. To do so, the adaptive filter can determine the multi-scale features and weights for this pixel of RGB-IR pixel data 505. Weights 535 can be determined based on neighborhood 506 having a blue pixel and based further on a remosaicing function of functions 545 to interpolate a red pixel value from the given blue pixel. Accordingly, the weight and pixel data of neighborhood 506 can be provided to functions 545 to apply the remosaicing function and produce a red pixel at the first row and third column location of RGB pixel data 550. This process can occur for all pixels of RGB-IR pixel data 505 to interpolate pixel values for RGB pixel data 550.

By way of yet another example, neighborhood 506 may include the first red pixel of RGB-IR pixel data 505 (top left corner red pixel) and several corresponding neighboring pixels with respect to the first red pixel. After determining the multi-scale features for this pixel, the adaptive filter can pass the features to fully-connected layer 530 to produce weights 540. Weights 540 can be used to interpolate an IR pixel value from the selected red pixel, upsample an IR pixel value present in the red pixel, and/or decontaminate the red pixel of an IR pixel value, among other image processing functions. In one example, the adaptive filter can perform a remosaicing function on the red pixel to interpolate the IR pixel value from the red pixel. Accordingly, the adaptive filter can determine weights 540 based on the color channel of the central pixel of neighborhood 506 (i.e., the red pixel) and provide weights 540 to functions 546 along with the pixel data of neighborhood 506 to produce the IR pixel in the top left corner of IR pixel data 555. This process can occur for all pixels of RGB-IR pixel data 505 for any image processing functions to produce an IR-only pixel pattern as in IR pixel data 555.

In various examples, pixels of RGB-IR pixel data 505 are fed through convolution layers 510 and 515, and accordingly, the adaptive filter, one-by-one in a sliding window fashion. In this way, one or more of functions 545 and 546 can be applied to each pixel to produce output(s) using the pixel (i.e., either a value for RGB pixel data 550 or IR pixel data 555 or both) and corresponding neighboring pixels. In some cases, other functions, like noise filtering or tone mapping, can be performed via functions 545 and 546. For example, in such cases, different coefficients can be applied at either convolution layers 510 and 515 and/or at fully-connected layers 525 and 530 based on which function the adaptive filter is being used for. Accordingly, any variation and/or combination of features and weights can produce outputs for image signal processing.

Figure 6:
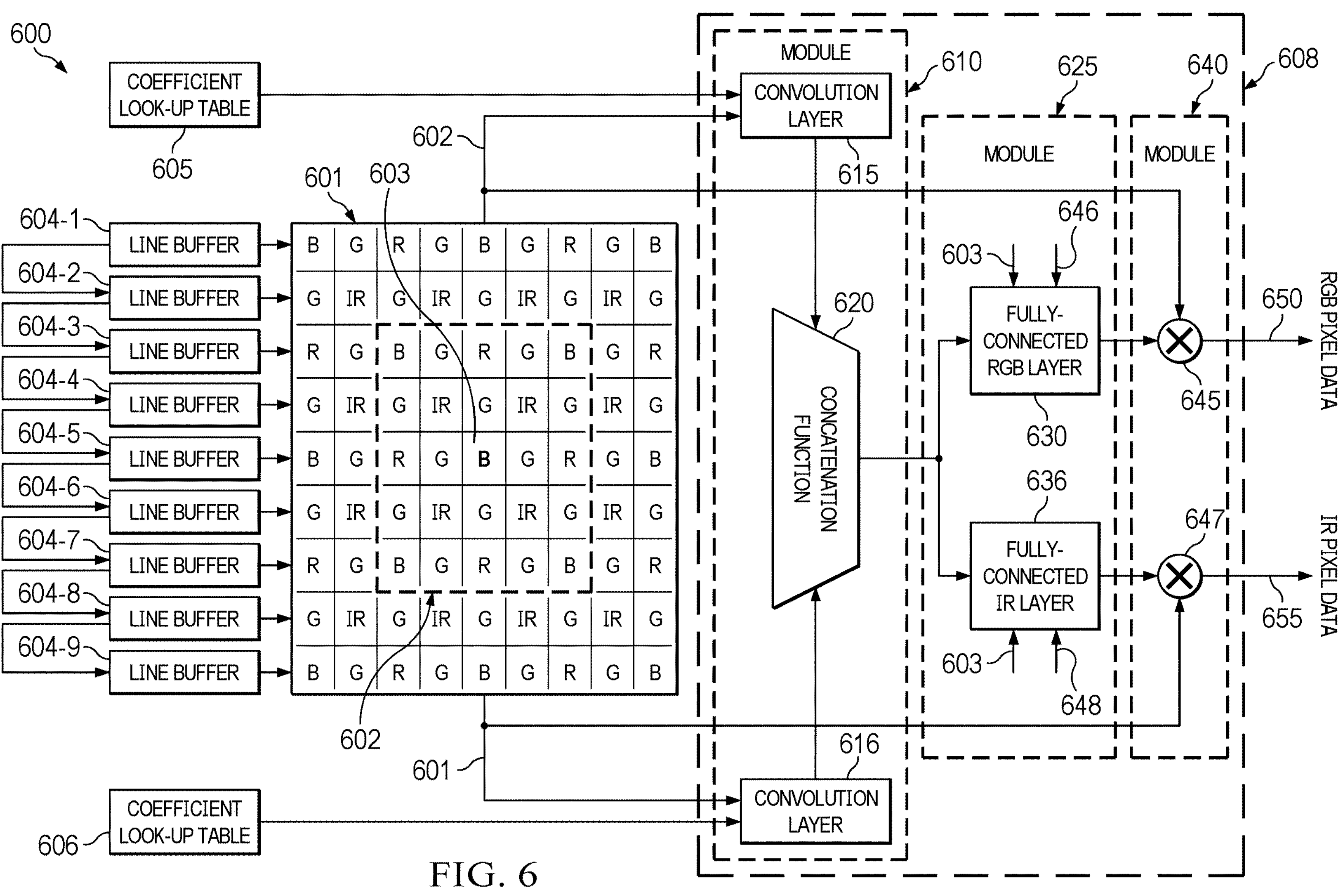
FIG. 6 illustrates an example adaptive filter configurable to perform pixel pattern conversion operations using convolutional layers and adaptive weights.

FIG. 6 illustrates an example adaptive filter configurable to perform pixel pattern conversion operations using convolutional layers and adaptive weights. FIG. 6 shows operating environment 600 including elements and components of adaptive filter 608, which is representative of an adaptive filter of a pattern conversion component, such as adaptive filter 216 of FIG. 2 and/or adaptive filter 446 of FIG. 4. Adaptive filter 608 includes modules 610, 625, and 640. Module 610 includes convolution layers 615 and 616 and concatenation function 620. Module 625 includes fully-connected RGB layer 630 and fully-connected IR layer 636. Module 640 includes functions 645 and 647, which output RGB pixel data 650 and IR pixel data 655, respectively. In various examples, modules 610, 625, and 640 can represent hardware accelerators (HWA) in an image processing pipeline, such as image processing pipeline 115 of FIG. 1.

In operation, pixel data 601 is captured by an imaging system and fed to an image processing pipeline including modules 610, 625, and 640, or collectively, adaptive filter 608, for various image signal processing activities. For example, pixel data 601 may be representative of 4×4 RGB-IR pixel data 211 of FIG. 2. Pixel data 601 includes a plurality of pixels arranged in a 4×4 CFA pattern, such as in an RGB-IR pattern. Each pixel in the data set may have different values (e.g., a red pixel may have a greater red value than another red pixel) than other pixels of pixel data 601. For example, some pixels may have higher brightness values than other pixels, which may indicate an image feature (e.g., a bright spot) of image data represented by pixel data 601.

Pixel data 601 can be stored in various line buffers (collectively line buffers 604). In various examples, the image processing pipeline, or a system including the image processing pipeline, can utilize nine line buffers. Each line buffer can store one row of pixels of pixel data 601. For example, line buffer 604-1 can hold the first row of data, line buffer 604-2 can hold the second row of data, line buffer 604-3 can hold the third row of data, line buffer 604-4 can hold the fourth row of data, line buffer 604-5 can hold the fifth row of data, line buffer 604-6 can hold the sixth row of data, line buffer 604-7 can hold the seventh row of data, line buffer 604-8 can hold the eighth row of data, and line buffer 604-9 can hold the ninth row of data. Other combinations or variations of line buffers or memory storage schemes can be contemplated but are not discussed for the sake of brevity.

Pixel data 601 includes a 9×9 selection of pixels with a central pixel 603. The pixels can be fed as input to adaptive filter 608 (e.g., a convolution neural network (CNN)). During pattern conversion processes, adaptive filter 608 can receive pixel subset 602 (a 5×5 subset of pixel data 601), interpolate color and IR pixel values for central pixel 603, and decontaminate central pixel 603 from IR contamination. Such processes may be repeated for a different central pixel 603, and consequently, a different grouping of pixel subset 602. Additionally, a different 9×9 selection of pixel data 601 from line buffers 604 can be fed through adaptive filter 608. In this way, pixel data 601 and pixel subset 602 can be treated as sliding windows of pixels. For example, during each iteration, a different group of pixels can be obtained from line buffers 604 and supplied to adaptive filter 608. This process can repeat until each of the pixels of pixel data 601 has been used as central pixel 603 or until adaptive filter 608 has produced outputs for RGB pixel data 650 and IR pixel data 655.

In the example illustrated in operating environment 600, pixel subset 602 includes pixels from line buffers 604-3, 604-4, 604-5, 604-6, and 604-7, with central pixel 603 being a blue pixel. The pixel data of pixel subset 602 is obtained from respective ones of line buffers 604 and fed to module 610, or convolution layers 615 and 616. In other examples, however, different subsets of pixels from any combination or variation of line buffers 604 can be selected and fed to convolution layer 615 and/or convolution layer 616.

In addition to pixel subset 601, coefficients from coefficient look-up tables 605 and 606 can be provided to convolution layers 615 and 616, respectively, of module 610. Coefficient look-up tables 605 and 606 include a plurality of coefficients to be used during convolution processes. Such coefficients may include learnt values during training of adaptive filter 608 for pattern conversion. In an example, coefficient look-up table 605 can include sets of coefficients, which convolution layer 615 can use to calculate features associated with central pixel 603. Similarly, coefficient look-up table 606 can include different sets of coefficients, which convolution layer 616 can use to calculate different features associated with central pixel 603. In some cases, coefficient look-up tables 605 and 606 each include four sets of 25 coefficients. The coefficients may correspond to individual pixels of a 5×5 grouping of pixels (i.e., pixel subset 602), and adaptive filter 608 can use each of the four set of coefficients to calculate four features for the pixels.

Convolution layers 615 and 616 are representative of layers in adaptive filter 608 configured to perform convolution and dilated convolution operations on selected pixels 601 and pixel subset 602. Convolution layer 615 may be configured to perform convolution operations on pixel subset 602, while convolution layer 616 may be configured to perform dilated convolution operations on selected pixel data 601. In an example, convolution layer 615 can obtain a first subset of pixel data 601 (pixel subset 602), and convolution layer 616 can obtain a second subset of pixel data 601 different than pixel subset 602 to perform dilated convolution using dilation factor 2, for example. Both convolution layers 615 and 616 can produce feature vectors, using coefficients from respective ones of coefficient look-up tables 605 and 606, that differ from each other due to varying convolution techniques employed by each other. The different feature vectors can be fed into concatenation function 620.

Concatenation function 620 is configured to receive the feature vectors from convolution layers 615 and 616 and produce multi-scale features associated with central pixel 603 of pixel subset 602. The multi-scale features can include information about central pixel 603, such as whether the location of central pixel 603 is a bright spot or a dark spot, whether that location is near a corner and/or edge in the image data, and whether other image features are present. The features can be supplied as inputs to fully-connected RGB layer 630 and fully-connected IR layer 636 of module 625.

Fully-connected RGB layer 630 and fully-connected IR layer 636 can be configured to generate weights associated with central pixel 603 using the multi-scale features identified by adaptive filter 608. In the example illustrated in FIG. 6, fully-connected RGB layer 630 determines weights applicable to produce values for visible light pixels, or color pixels (e.g., red, green, and blue pixels), while fully-connected IR layer 636 determines weights applicable to produce values for non-visible light pixels (e.g., IR pixels). Fully-connected RGB layer 630 and fully-connected IR layer 636 can produce multiple weights for central pixel 603 depending on various factors, such as the color channel of central pixel 603, the neighboring pixels surrounding central pixel 603, and/or the operation to be performed on the pixel (e.g., remosaicing, upsampling, decontamination). To produce the weights for central pixel 603, among other pixels, fully-connected RGB layer 630 and fully-connected IR layer 636 can use coefficients 646 and 648, respectively. Coefficients 646 and 648 may include values stored in look-up tables (not illustrated) different from coefficient look-up tables 605 and 606. Coefficients 646 and 648, like the coefficients of look-up tables 605 and 606, may include learnt values obtained during training of adaptive filter 608. In an example, coefficients 646 and 648 each can include multiple sets of coefficients that can be used to produce weights for functions 645 and 647. By way of example, coefficients 646 and 648 may include eight sets of 200 coefficients (e.g., 8 multi-scale features of central pixel 603 to be translated to 25 weight values used in functions 645 or 647). Such coefficients can be applied to the multi-scale features of central pixel 603 at fully-connected RGB layer 630 and fully-connected IR layer 636 based on central pixel 603 and neighboring pixels of central pixel 603. Fully-connected layers 630 and 636 can provide the weights to functions 645 and 647 of module 640, respectively, to produce a portion of RGB pixel data 650 and IR pixel data 655 associated with central pixel 603 of subset 602.

In an example, for a blue pixel (central pixel 603), fully-connected RGB layer 630 may select a set of coefficients from coefficient look-up table 646 based on central pixel 603 belonging to the blue color channel, the neighboring pixels around central pixel 603, and an operation to be performed on central pixel 603 (e.g., upsampling). Function 645 can apply the calculated weights to the 602 and generate an upsampled blue pixel value at the location of central pixel 603 for RGB pixel data 650. In another example, for the same blue pixel (central pixel 603), fully-connected IR layer 636 may select a different set of coefficients from coefficient look-up table 648 based on central pixel 603 belonging to the blue color channel, the neighboring pixels around central pixel 603, and an IR-related operation to be performed on central pixel 603 (e.g., IR interpolation). Function 647 can apply the calculated weight to the 602 and generate an interpolated IR pixel value at the location of central pixel 603 for IR pixel data 655. In this way, multiple functions can be performed on the same central pixel 603 to concurrently produce different outputs.

In various embodiments, after module 610 performs convolution and concatenation processes on a first central pixel and provides data associated with the first central pixel to module 625, module 610 can perform convolution and concatenation processes on a second central pixel (i.e., without waiting for modules 625 and 640 to complete respective processes). Module 625 can calculate weights associated with the first central pixel, provide these weights to module 640, and obtain data from module 610 corresponding to the second central pixel. Module 640 can obtain the weights from module 625 and pixel subset 602, corresponding to the first central pixel, from module 610 to perform pixel pattern conversion processes. Modules 610, 625, and 640 can function as independent HWAs that can perform respective processes on one central pixel at a time. Accordingly, one cycle through adaptive filter 608 can produce one output pixel for RGB pixel data 650 and IR pixel data 655. In other embodiments, however, modules 610, 625, and 640 can function as a single HWA. Once all of pixel data 601 has been processed by the modules, RGB pixel data 650 and IR pixel data 655 can include interpolated pixel values arranged in 2×2 RGB and 2×2 IR pixel patterns, respectively, from the data of pixel data 601.

More specifically, during pattern conversion processes, upstream components relative to adaptive filter 608 (e.g., upstream component 210 of FIG. 2) in an image processing pipeline (e.g., image processing pipeline 205 of FIG. 2) may feed data to adaptive filter 608 of operating environment 600 only after processing the entire input image. Alternatively, the upstream components may feed data to adaptive filter 608 immediately after processing data, such as at the pixel level. Likewise, adaptive filter 608 may provide data to downstream components relative to adaptive filter 608 (e.g., downstream components 220 and 225 of FIG. 2) at either the image level or pixel level. When such components transfer data at the pixel level during pattern conversion processes, line buffers 604 may act as a circular buffer whereby line buffer 604-9 feeds back into line buffer 604-1 (not illustrated). Accordingly, in some examples, adaptive filter 608, or more specifically, module 610 of adaptive filter 608, may start processing pixel data 601 only when all required pixel data 601 is available in line buffers 604.

In various alternative embodiments, adaptive filter 608, and modules thereof, can perform other image processing activities. For example, coefficient look-up tables 605 and 606 may include different values based on training for a respective image processing activity. Further coefficients 646 and 648 may also include different values to calculate weights applicable to the pixels of pixel data 601 used to produce different output pixel data.

While some examples provided herein are described in the context of an imaging subsystem, image sensor, layer, or environment, the pixel defect detection and correction systems and methods described herein are not limited to such embodiments and may apply to a variety of other processes, systems, applications, devices, and the like. Aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are inclusive meaning "including, but not limited to." In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A. A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. An image processing pipeline, comprising:
- an upstream component;
- a pattern conversion component downstream with respect to the upstream component in the image processing pipeline; and
- a downstream component relative to the pattern conversion component;
- wherein the pattern conversion component is configured to:
  - obtain red green blue (RGB)-infrared (IR) pixel data produced by the upstream component of the image processing pipeline;
  - convert the RGB-IR pixel data into RGB pixel data and IR pixel data using an adaptive filter; and
  - supply the RGB pixel data and IR pixel data to the downstream component of the image processing pipeline;
- wherein to convert the RGB-IR pixel data into the RGB pixel data and the IR pixel data, the adaptive filter is configured to, for each pixel of the RGB-IR pixel data:
  - select a weight from weights generated for the pixel based on a type of conversion operation including a remosaicing operation, an upsampling operation, and a decontamination operation; and
  - apply the weight to the pixel, resulting in an interpolated value for the pixel for use in the conversion operation.

2. The image processing pipeline of claim 1, wherein the adaptive filter is further configured to:
- for each pixel of the RGB-IR pixel data:
  - identify one or more features of the pixel based on a context of the pixel, wherein the one or more features comprise a location feature indicative of a location of the pixel with respect to other pixels and a brightness feature indicative of a brightness of the location; and
  - generate the weights based on the features.

3. The image processing pipeline of claim 1, wherein the adaptive filter is further configured to convert the RGB-IR pixel data into the RGB pixel data and the IR pixel data using the interpolated values of the pixels of the RGB-IR pixel data.

4. The image processing pipeline of claim 2, wherein the context of the pixel comprises a characteristic of the pixel and a characteristic of one or more neighboring pixels, with respect to the pixel, of the RGB-IR pixel data.

5. The image processing pipeline of claim 1, wherein to apply the weight, the adaptive filter is configured to obtain the weight from a look-up table and perform the conversion operation with the pixel.

6. The image processing pipeline of claim 5, wherein a color channel of the pixel includes one among RGB or IR.

7. The image processing pipeline of claim 2, wherein the adaptive filter is further configured to:
- for each pixel of the RGB-IR pixel data:
  - identify an IR contamination value of the pixel; and
  - subtract the IR contamination value from the interpolated value of the pixel.

8. The image processing pipeline of claim 1, wherein the adaptive filter comprises a convolutional neural network.

9. A pattern conversion component in an image processing pipeline, comprising:
- an interface configured to communicate with upstream components and downstream components of the image processing pipeline relative to the pattern conversion component; and
- circuitry coupled to the interface and configured to:
  - obtain, via the interface, red green blue (RGB)-infrared (IR) pixel data produced by an upstream component of the image processing pipeline;
  - convert the RGB-IR pixel data into RGB pixel data and IR pixel data using an adaptive filter; and
  - supply, via the interface, the RGB pixel data and the IR pixel data to a downstream component of the image processing pipeline;
  - wherein to convert the RGB-IR pixel data into the RGB pixel data and the IR pixel data, the circuitry is configured to, for each pixel of the RGB-IR pixel data:
    - select a weight from weights generated for the pixel based on a type of conversion operation including a remosaicing operation, an upsampling operation, and a decontamination operation; and
    - apply the weight to the pixel, resulting in an interpolated value for the pixel for use in the conversion operation.

10. The pattern conversion component of claim 9, wherein the circuitry is further configured to:
- for each pixel of the RGB-IR pixel data:
  - identify one or more features of the pixel based on a context of the pixel, wherein the one or more features comprise a location feature indicative of a location of the pixel with respect to other pixels and a brightness feature indicative of a brightness of the location; and generate the weights based on the features.

11. The pattern conversion component of claim 9, wherein the circuitry is further configured to convert the RGB-IR pixel data into the RGB pixel data and the IR pixel data using the interpolated values of the pixels of the RGB-IR pixel data.

12. The pattern conversion component of claim 10, wherein the context of the pixel comprises a characteristic of the pixel and a characteristic of one or more neighboring pixels with respect to the pixel.

13. The pattern conversion component of claim 9, wherein to apply the weight, the circuitry is configured to obtain the weight from a look-up table and perform the conversion operation with the pixel.

14. The pattern conversion component of claim 13, wherein a color channel of the pixel includes one among RGB or IR.

15. The pattern conversion component of claim 9, wherein the circuitry is further configured to:

for each pixel of the RGB-IR pixel data:

identify an IR contamination value of the pixel; and subtract the IR contamination value from the interpolated value of the pixel.

16. The pattern conversion component of claim 9, wherein the adaptive filter comprises a convolutional neural network.

17. A method comprising:

obtaining, by a pattern conversion component of an image processing pipeline, red green blue (RGB)-infrared (IR) pixel data produced by a component of the image processing pipeline upstream relative to the pattern conversion component;

converting, by the pattern conversion component, the RGB-IR pixel data into RGB pixel data and IR pixel data by:

identifying, by the pattern conversion component, features of pixels of the RGB-IR pixel data based on a context of the pixels;

calculating, by the pattern conversion component, weights for the pixels based on the features; and applying, by the pattern conversion component, a weight to each of the pixels, wherein the applied weight is selected based on a color channel of a given pixel and a type of conversion operation applied to the given pixel, and wherein the type of operation includes one or more of a remosaicing operation, an upsampling operation, and a decontamination operation; and supplying, by the pattern conversion component, the RGB pixel data and IR pixel data to a downstream component of the image processing pipeline relative to the pattern conversion component.

18. The method of claim 17, wherein the context comprises a characteristic of the RGB-IR pixel data at a location associated with a given pixel and a characteristic of neighboring pixels of the RGB-IR pixel data with respect to the given pixel.

19. The method of claim 17, wherein the applied weight is further selected based on a desired output pixel array including either the RGB pixel data or the IR pixel data.

20. The method of claim 18, wherein the method further comprises:

identifying IR contamination values of the pixels of the RGB-IR pixel data; and subtracting the IR contamination values from the pixels of the RGB pixel data.

* * * * *